(12) United States Patent
Cyrusian

(10) Patent No.: US 9,367,385 B2
(45) Date of Patent: Jun. 14, 2016

(54) HIGH SPEED SERIAL DATA RECEIVER ARCHITECTURE WITH DUAL ERROR COMPARATORS

(71) Applicant: Marvell World Trade Ltd., St. Michael (BB)

(72) Inventor: Sasan Cyrusian, Scotts Valley, CA (US)

(73) Assignee: Marvell World Trade Ltd., St. Michael (BB)

( * ) Notice: Subject to any disclaimer, the term of this patent is extended or adjusted under 35 U.S.C. 154(b) by 95 days.

(21) Appl. No.: 14/202,041

(22) Filed: Mar. 10, 2014

(65) Prior Publication Data

US 2014/0281845 A1    Sep. 18, 2014

Related U.S. Application Data

(60) Provisional application No. 61/777,741, filed on Mar. 12, 2013.

(51) Int. Cl.
  *G06F 11/08*    (2006.01)
  *H04L 25/03*    (2006.01)

(52) U.S. Cl.
  CPC .......... *G06F 11/08* (2013.01); *H04L 25/03057* (2013.01)

(58) Field of Classification Search
  CPC .......................... H04L 25/03057; G06F 11/08
  See application file for complete search history.

(56) References Cited

U.S. PATENT DOCUMENTS

| | | | |
|---|---|---|---|
| 6,014,042 A | 1/2000 | Nguyen | |
| 6,665,358 B1 | 12/2003 | Odagiri | |
| 6,788,116 B1 | 9/2004 | Cook et al. | |
| 8,779,958 B1 | 7/2014 | Maurino et al. | |
| 9,059,874 B2 | 6/2015 | Cyrusian | |
| 2003/0141912 A1 | 7/2003 | Sudjian | |
| 2005/0212599 A1 | 9/2005 | Lin et al. | |
| 2006/0176040 A1 | 8/2006 | Kernahan et al. | |
| 2007/0197265 A1 | 8/2007 | Park et al. | |

(Continued)

FOREIGN PATENT DOCUMENTS

EP    0363332 A2    4/1990

OTHER PUBLICATIONS

Thomas Toifl et al., "A 2.6 mW/Gbps 12.5 Gbps RX With 8-Tap Switched-Capacitor DFE in 32 nm CMOS", IEEE Journal of Solid-State Circuits, Apr. 1, 2012, pp. 897-910, vol. 4 7, No. 4, Piscataway, NJ, USA.

(Continued)

*Primary Examiner* — Albert Decady
*Assistant Examiner* — Kyle Vallecillo

(57) ABSTRACT

A receiver path including first, second, third, and fourth comparator modules. The first comparator module is configured to generate, based on a signal received via the receiver path, a first digital output signal indicative of a sum of first data in the received signal and a first error. The second comparator module is configured to generate, based on the signal received via the receiver path, a second digital output signal indicative of a sum of second data in the received signal and a second error. The third comparator module is configured to generate, based on the signal received via the receiver path, a third digital output signal indicative of the first data in the received signal. The fourth comparator module is configured to generate, based on the signal received via the receiver path, a fourth digital output signal indicative of the second data in the received signal.

18 Claims, 5 Drawing Sheets

(56) References Cited

U.S. PATENT DOCUMENTS

2009/0224806 A1\* 9/2009 Huang et al. .................. 327/72
2010/0046597 A1 2/2010 Farjad-rad
2014/0050260 A1 2/2014 Cyrusian

OTHER PUBLICATIONS

Reid Riedlinger et al., "A 32 nm, 3.1 Billion Transistor, 12 Wide Issue Itanium Processor for Mission-Critical Servers", IEEE Journal of Solid-State Circuits, Jan. 1, 2012, pp. 177-193, vol. 47, No. 1, Piscataway, NJ, USA.

Balamurugan G. et al., "Modeling and Analysis of High-Speed I/O Links", IEEE Transactions on Advanced Packaging, May 1, 2009, pp. 237-247, vol. 32, No. 1, Piscataway, NJ, USA.

International Search Report and Written Opinion for PCT/IB2013/001752 mailed Feb. 21, 2014, 16 pages.

International Search Report and Written Opinion for PCT/US2014/028434 mailed Jun. 27, 2014, 14 pages.

\* cited by examiner

HIGH SPEED SERIAL DATA RECEIVER ARCHITECTURE WITH DUAL ERROR COMPARATORS

CROSS-REFERENCE TO RELATED APPLICATIONS

This application claims the benefit of U.S. Provisional Application No. 61/777,741 filed on Mar. 12, 2013. This application is related to U.S. patent application Ser. No. 13/962,900, filed on Aug. 8, 2013. The entire disclosures of the applications referenced above are incorporated herein by reference.

FIELD

The present disclosure relates to comparators in a receiver path of a communication interface.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A signal path between a transmitter and a receiver (e.g., a receiver path of a serial data interface) includes a communication channel. For example, the serial data interface may be a high speed serial data interface. A signal transmitted via the communication channel may be modified by noise, interference, and/or frequency-dependent attenuation and dispersion. Frequency-dependent attenuation can introduce distortions into the transmitted signal. For example, the distortions may include inter-symbol interference (ISI) and jitter. The distortions may cause errors in the signal as received by the receiver.

The communication channel may be implemented using differential signaling. Differential signaling can reduce the effects of some forms of interference, such as common mode noise. Equalizers such as Continuous Time Linear Equalizers (CTLEs) may be used in communication channels to partially compensate for channel attenuation. A CTLE may be implemented as a differential amplifier with a fixed or programmable frequency dependent degeneration feature. For example, programmable frequency dependent degeneration may be implemented, which allows adjusting one or more resistance and/or capacitance values in the differential amplifier. The resistance and capacitance values may also define a "roll up point," which refers to a minimum frequency at which the differential amplifier will start to boost the output signal of the differential amplifier.

FIG. 1 shows a receiver path 100 (e.g., of a serial data receiver) including a communication channel 104, an equalizer 108, an error comparator module 112, and a data comparator module 116. The error comparator module 112 includes a sampler 120, a summer 124, a decision feedback estimation (DFE) module 128, and a slicer 132. The equalizer 108 may be, for example, a switched continuous time linear equalizer (CTLE) or a switched CTLE with an integrated sampler.

The equalizer 108 receives an input signal 136 via the communication channel 104 and generates an output signal 140. Each of the input signal 136 and the output signal 140 may include a differential signal pair. The equalizer 108 performs equalization on the input signal 136 to generate the output signal 140. For example, the equalizer 108 may include a differential amplifier.

The input signal 136 received from the communication channel 104 may include attenuation (e.g., frequency dependent attenuation). For example, the frequency dependent attenuation caused by skin effect and dielectric loss, which are two possible sources of attenuation in the communication channel 104, is proportional to a square root of a frequency and the frequency, respectively. The equalizer 108 compensates for any attenuation in the input signal 136 to generate the output signal 140.

The sampler 120 samples the output signal 140 to generate a sampled signal 144. The summer 124 receives the sampled signal 144 and an output 148 of the DFE module 128. For example, the summer 124 may add one or more signals corresponding to the output 148 to the sampled signal 144 or subtract one or more signals from the sampled signal 144. The slicer 132 receives an output 152 of the summer 124 and determines a digital value corresponding to the input signal 136. The slicer 132 generates a digital output 156 that is, for example, a digital high (e.g., "1") or a digital low (e.g., "0"). The digital output 156 may correspond to a digital error output. In some implementations, the slicer 132 may determine a multi-bit digital value that corresponds to the input signal 136 and generate a corresponding multi-bit digital output 156. In some implementations, the summer 124 and the DFE module 128 may be omitted and the equalizer 108 is instead connected directly to the slicer 132.

Similarly, the data comparator module 116 includes a sampler 160, a summer 164, a DFE module 168, and a slicer 172. The sampler 160 samples the output signal 140 to generate a sampled signal 176. The summer 164 receives the sampled signal 176 and an output 180 of the DFE module 168. The slicer 172 receives an output 184 of the summer 164 and determines a digital value corresponding to the input signal 136. The slicer 172 generates a digital output 188. The digital output 188 may correspond to a digital data output. In some implementations, the slicer 172 may determine a multi-bit digital value that corresponds to the input signal 136 and generate a corresponding multi-bit digital output 188.

A digital adaptation module 192 receives the digital outputs 156 and 188 from the error comparator module 112 and the data comparator module 116, respectively. The digital adaptation module 192 generates corresponding feedback signals 196-1 and 196-2, referred to collectively as feedback signals 196, based on the digital outputs 156 and 188, and generates a digital output signal 200. The feedback signals 196 are provided to the error comparator module 112 and the data comparator module 116.

The feedback signals 196 include digital-to-analog converter (DAC) values and polarities. The feedback signals 196-1 provided to the error comparator module 112 may also include error inputs. The DFE module 128 generates the output 148 based on the feedback signals 196-1. For example, the DFE module 128 may include one or more DACs and the feedback signals 196-1 correspond to optimal values for digital inputs of the DACs. In this manner, the digital adaptation module 192 adapts, or trains, the DFE module 128 until the optimal values are determined. Similarly, the DFE module 168 generates the output 180 based on the feedback signals 196-2.

A clock such as a data clock 204 is provided to each of the error comparator module 112 and the data comparator module 116. For example, the data clock 204 provided to the error comparator module 112 and the data comparator module 116 may be the same clock.

FIG. 2 shows a receiver path 220 including a communication channel 224, an equalizer 228, an error comparator module 232, an odd data comparator module 236, and an even data comparator module 240. Each of the error comparator module 232, the odd data comparator module 236, and the even data comparator module 240 receive an output 244 of the equalizer 228 and provide respective digital outputs 248, 252, and 256 to a digital adaptation module 260 accordingly. The digital adaptation module 260 provides respective feedback signals 264-1, 264-2, and 264-3 (referred to collectively as feedback signals 264) based on the digital outputs 248, 252, and 256 and generates a digital output 268.

The receiver path 220 may correspond to, for example, an ultra-high speed receiver path. In an ultra-high speed receiver path, each of the error comparator module 232, the odd data comparator module 236, and the even data comparator module 240 may be clocked at half of a data rate (e.g., half of a rate at which the data is received by the receiver path 220). Accordingly, each of the error comparator module 232, the odd data comparator module 236, and the even data comparator module 240 receive a half-rate clock. For example, the odd data comparator module 236 receives an odd data clock 272 and the even data comparator module receives an even data clock 276. The odd data clock 272 and the even data clock 276 have a nominal phase difference of 180 degrees. As shown, the error comparator module 232 receives the odd data clock 272, but the error comparator module 232 may be configured to receive either of the odd data clock 272 or the even data clock 276.

SUMMARY

A receiver path includes a first comparator module configured to generate, based on a signal received via the receiver path, a first digital output signal. The first digital output signal is indicative of a sum of first data in the received signal and a first error associated with the first comparator module. A second comparator module is configured to generate, based on the signal received via the receiver path, a second digital output signal. The second digital output signal is indicative of a sum of second data in the received signal and a second error associated with the second comparator module. A third comparator module is configured to generate, based on the signal received via the receiver path, a third digital output signal. The third digital output signal is indicative of the first data in the received signal. A fourth comparator module is configured to generate, based on the signal received via the receiver path, a fourth digital output signal. The fourth digital output signal is indicative of the second data in the received signal.

In other features, the first error corresponds to an odd error, the second error corresponds to an even error, the first data corresponds to odd data, and the second data corresponds to even data. The first comparator module and the third comparator module receive a first clock signal, and the second comparator module and the fourth comparator module receive a second clock signal. The first clock signal is an odd clock signal, and ii) the second clock signal is an even clock signal. The first clock signal and the second clock signal have a phase difference of approximately 180 degrees.

In other features, a first sampler is configured to provide first samples of the received signal to the first comparator module and the third comparator module. The first samples correspond to the first data in the received signal. A second sampler is configured to provide second samples of the received signal to the second comparator module and the fourth comparator module. The second samples correspond to the second data in the received signal.

A method for operating a receiver path includes generating, based on a signal received via the receiver path, a first digital output signal, wherein the first digital output signal is indicative of a sum of first data in the received signal and a first error associated with the first digital output signal, generating, based on the signal received via the receiver path, a second digital output signal, wherein the second digital output signal is indicative of a sum of second data in the received signal and a second error associated with the digital output signal, generating, based on the signal received via the receiver path, a third digital output signal, wherein the third digital output signal is indicative of the first data in the received signal; and generating, based on the signal received via the receiver path, a fourth digital output signal, wherein the fourth digital output signal is indicative of the second data in the received signal.

In other features, the first error corresponds to an odd error, the second error corresponds to an even error, the first data corresponds to odd data, and the second data corresponds to even data. Generating the first digital output signal and generating the third digital output signal include receiving a first clock signal, and generating the second digital output signal and generating the fourth digital output signal include receiving a second clock signal. The first clock signal is an odd clock signal and the second clock signal is an even clock signal. The first clock signal and the second clock signal have a phase difference of approximately 180 degrees.

In other features, generating the first digital output signal and generating the third digital output include generating first samples of the received signal. The first samples correspond to the first data in the received signal. Generating the second digital output signal and generating the fourth digital output signal include generating second samples of the received signal. The second samples correspond to the second data in the received signal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

In a receiver path having an odd data comparator module and an even data comparator module that receive an odd data clock and an even data clock, respectively, the odd data clock and the even data clock may not be completely aligned. Accordingly, if an error comparator module in the receiver path is clocked using one of the odd data clock and even data clock, there may be a mismatch between the error comparator module and the data comparator modules. A receiver path according to principles of the present disclosure includes both an odd error comparator module and an even error comparator module. The odd error comparator module receives the odd data clock and the even error comparator module receives the even data clock.

Figure 1:
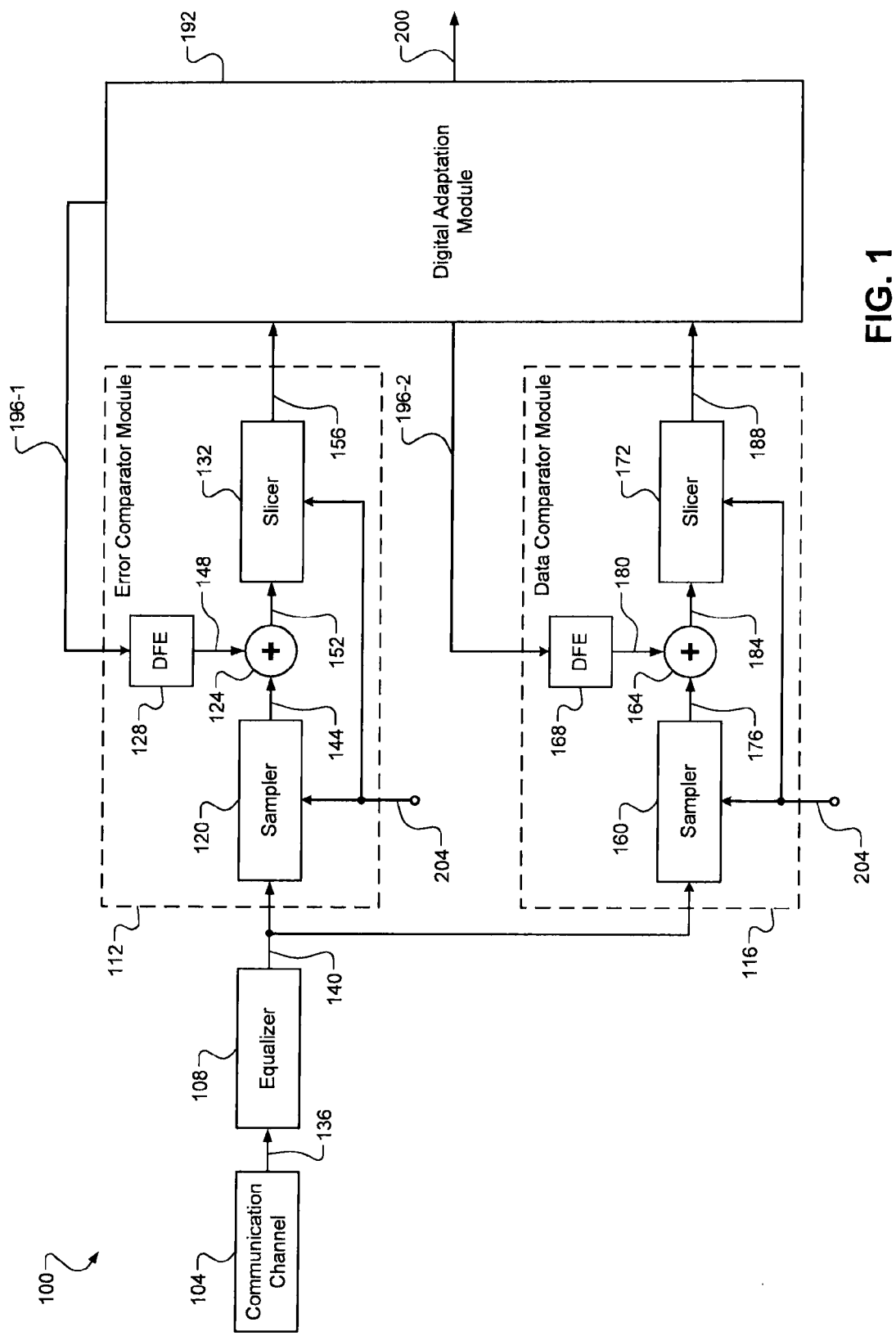
FIG. 1 is a functional block diagram of a receiver path.
Figure 2:
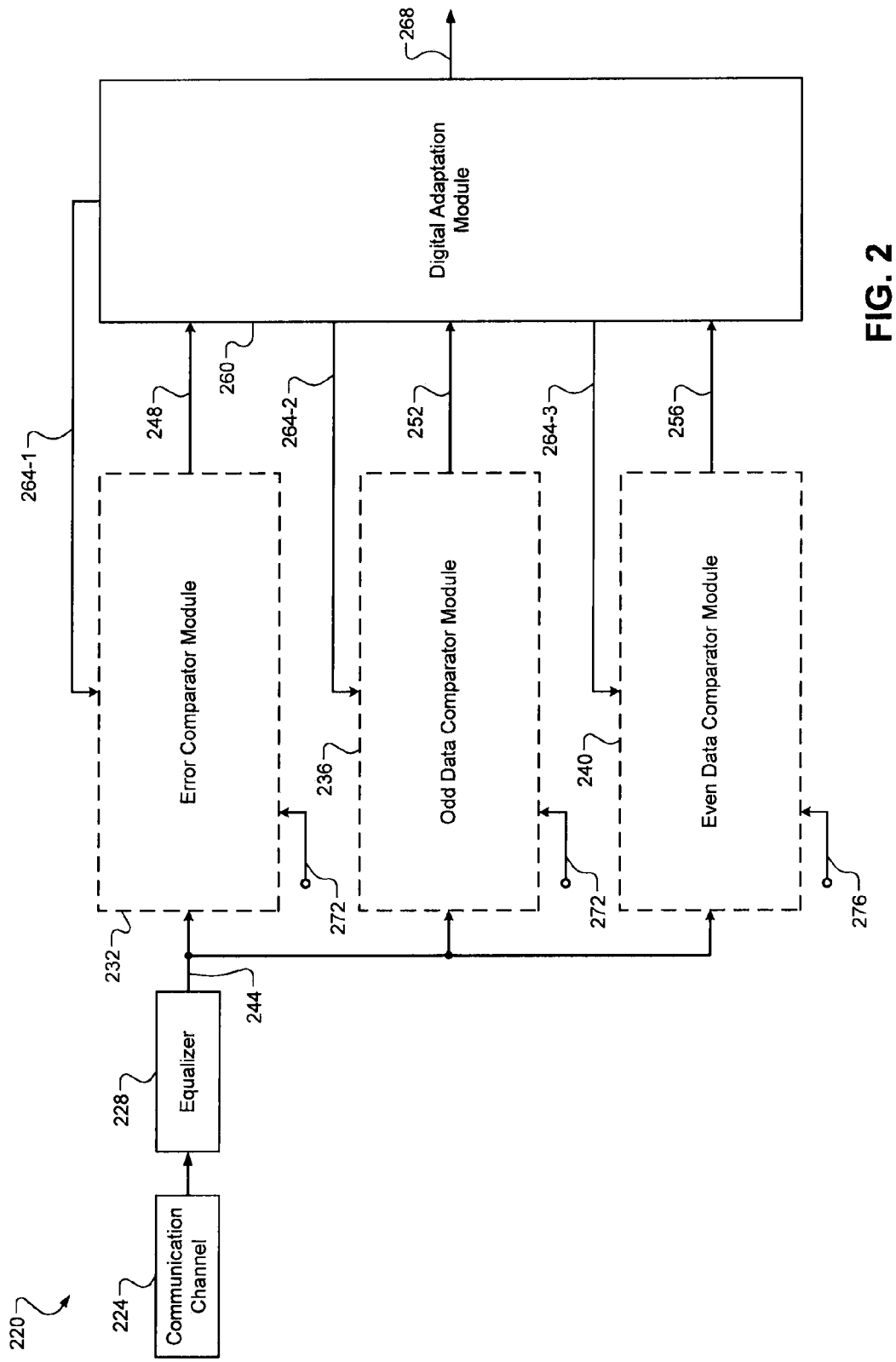
FIG. 2 is a functional block diagram of a receiver path including an odd data comparator module and an even data comparator module.
Figure 3:
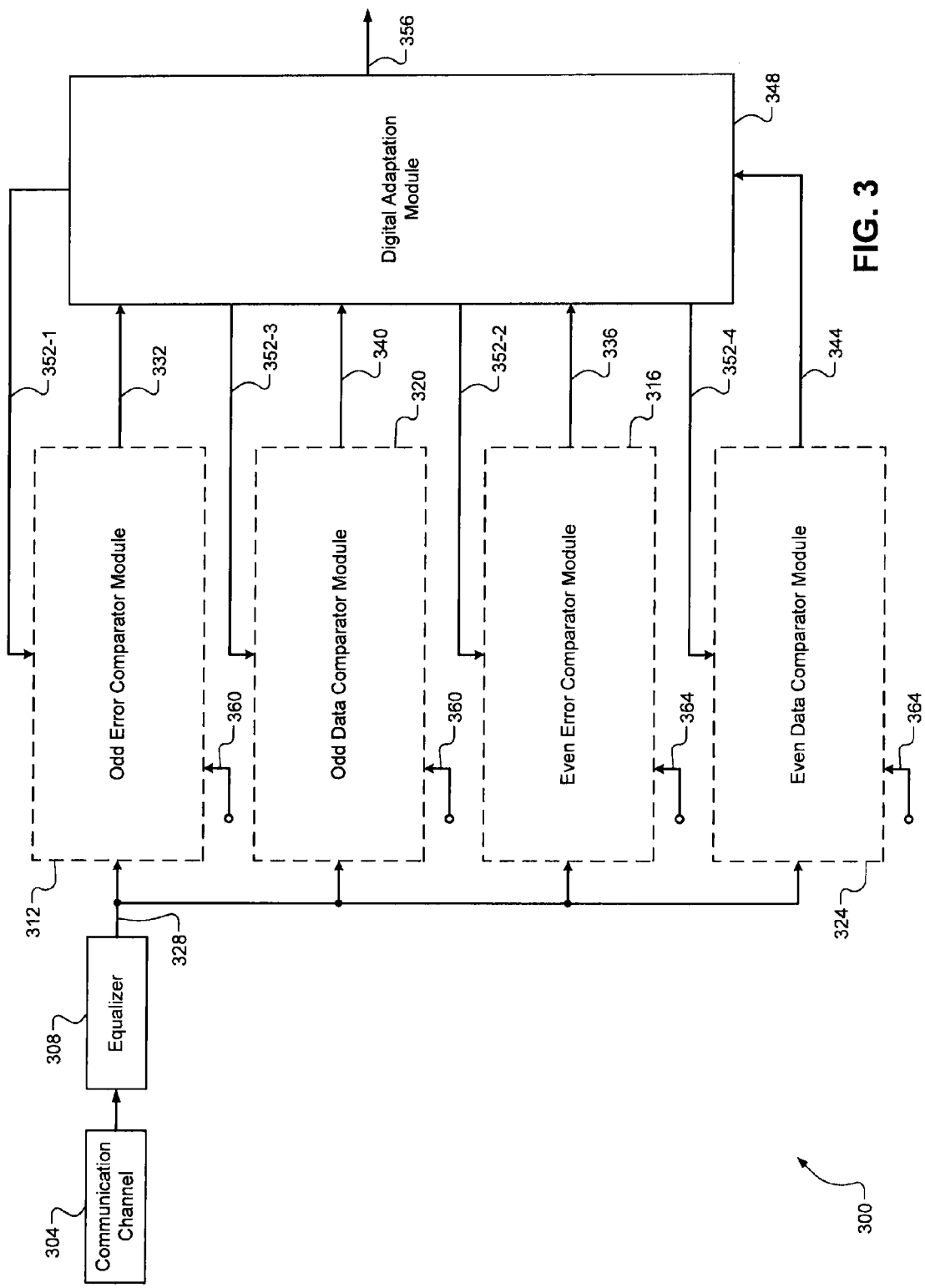
FIG. 3 is a functional block diagram of a receiver path including an odd error comparator module and an even error comparator module.

FIG. 3 shows a receiver path 300 including a communication channel 304, an equalizer 308, an odd error comparator module 312, an even error comparator module 316, an odd data comparator module 320, and an even data comparator module 324. Each of the odd error comparator module 312, the even error comparator module 316, the odd data comparator module 320, and the even data comparator module 324 receive an output 328 of the equalizer 308 and provide respective digital outputs 332, 336, 340, and 344 to a digital adaptation module 348 accordingly. The digital adaptation module 348 provides respective feedback signals 352-1, 352-2, 352-3, and 352-4 (referred to collectively as feedback signals 352) based on the digital outputs 332, 336, 340, and 344 and generates a digital output 356.

Accordingly, respective adaptive loops are formed between the digital adaptation module 348 and each of the odd error comparator module 312, the even error comparator module 316, the odd data comparator module 320, and the even data comparator module 324. For example, the digital output 332 and the feedback signal 352-1 form a first adaptive loop between the odd error comparator module 312 and the digital adaptation module 348. The digital output 336 and the feedback signal 352-2 form a second adaptive loop between the even error comparator module 316 and the digital adaptation module 348. The digital output 340 and the feedback signal 352-3 form a third adaptive loop between the odd data comparator module 320 and the digital adaptation module 348. The digital output 344 and the feedback signal 352-4 form a fourth adaptive loop between the even data comparator module 324 and the digital adaptation module 348.

The receiver path 300 may correspond to, for example, an ultra-high speed receiver path. Accordingly, each of the odd error comparator module 312, the even error comparator module 316, the odd data comparator module 320, and the even data comparator module 324 may be clocked at half of a data rate (e.g., half of a rate at which the data is received by the receiver path 300). Each of the odd error comparator module 312, the even error comparator module 316, the odd data comparator module 320, and the even data comparator module 324 receive a half-rate clock. For example, the odd data comparator module 320 receives an odd data clock 360 and the even data comparator module 324 receives an even data clock 364. The odd data clock 360 and the even data clock 364 have a nominal phase difference of 180 degrees.

Further, the odd error comparator module 312 also receives the odd data clock 360. Conversely, the even error comparator module 316 receives the even data clock 364. In this manner, mismatch errors between the error comparator modules 312 and 316 and the data comparator modules 320 and 324 are minimized because the odd error comparator module 312 and the odd data comparator module 320 receive the same clock 360, and the even error comparator module 316 and the even data comparator module 324 receive the same clock 364.

Figure 4:
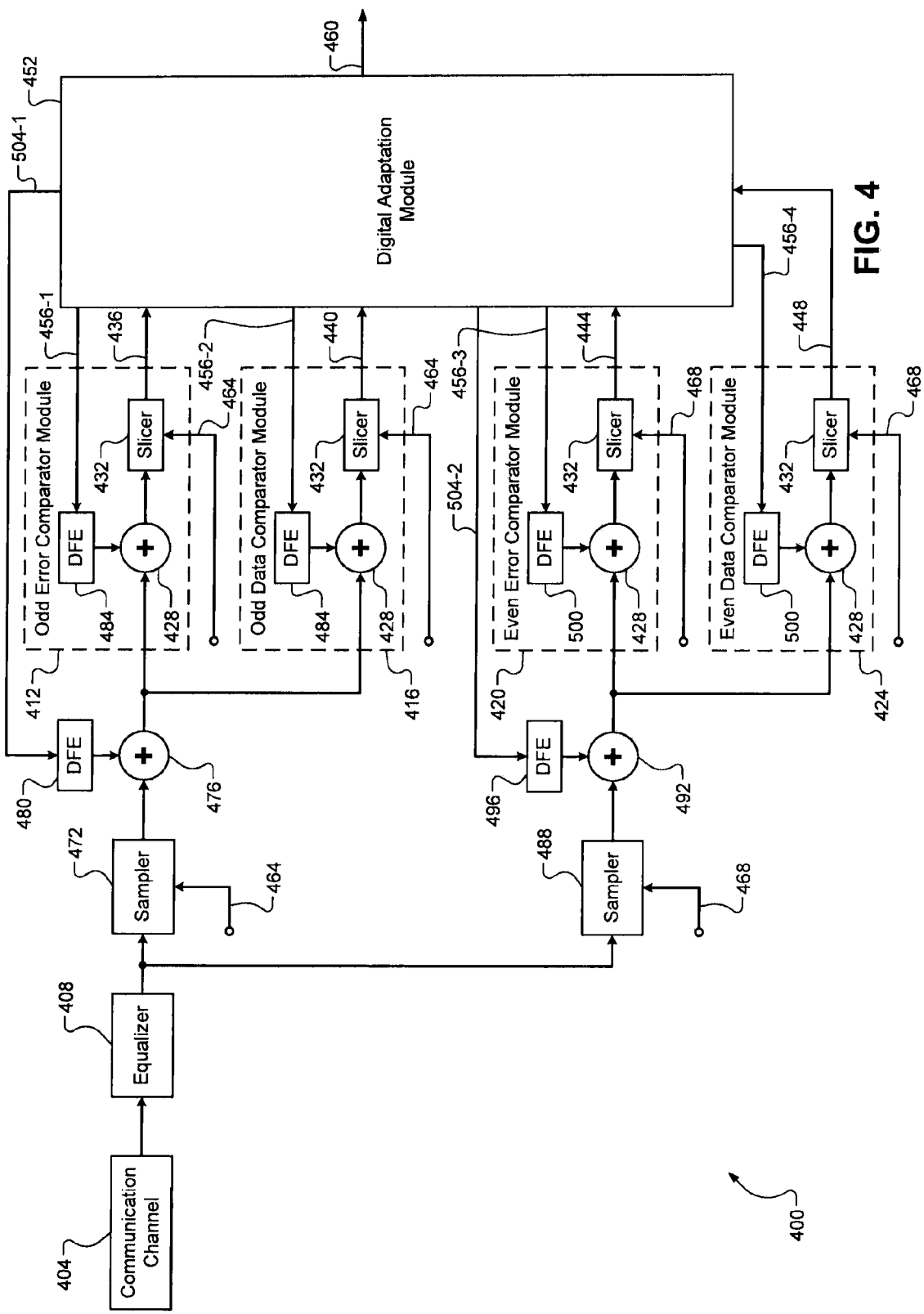
FIG. 4 is a functional block diagram of a receiver path including shared odd and even circuit paths.

FIG. 4 shows a receiver path 400 including a communication channel 404, an equalizer 408, an odd error comparator module 412, an odd data comparator module 416, an even error comparator module 420, and an even data comparator module 424. Each of the odd error comparator module 412, the odd data comparator module 416, the even error comparator module 420, and the even data comparator module 424 include a respective summer 428 and slicer 432 and provide respective digital outputs 436, 440, 444, and 448 to a digital adaptation module 452. The digital adaptation module 452 provides respective feedback signals 456-1, 456-2, 456-3, and 456-4 (referred to collectively as feedback signals 456) to the odd error comparator module 412, the odd data comparator module 416, the even error comparator module 420 based on the digital outputs 436, 440, 444, and 448 and generates a digital output 460.

Each of the odd error comparator module 412, the odd data comparator module 416, the even error comparator module 420, and the even data comparator module 424 may be clocked at half of a data rate (e.g., half of a rate at which the data is received by the receiver path 400). Each of the odd error comparator module 412, the odd data comparator module 416, the even error comparator module 420, and the even data comparator module 424 receive a half-rate clock. For example, the odd error comparator module 412 and the odd data comparator module 416 receive an odd data clock 464. The even error comparator module 420 and the even data comparator module 424 receive an even data clock 468. The odd data clock 464 and the even data clock 468 have a nominal phase difference of 180 degrees.

The odd error comparator module 412 and the odd data comparator module 416 share a sampler 472, a summer 476, and a DFE module 480. For example, some or all of the DACs in DFE modules of the odd error comparator module 412 and the odd data comparator module 416 may be moved to the DFE module 480. Although as shown the odd error comparator module 412 and the odd data comparator module 416 still include DFE modules 484, the DFE modules 484 may be eliminated if all of the associated DACs are moved to the shared DFE module 480. The sampler 472 is clocked with the odd data clock 464.

Conversely, the even error comparator module 420 and the even data comparator module 424 share a sampler 488, a summer 492, and a DFE module 496. For example, some or all of the DACs in DFE modules of the even error comparator module 420 and the even data comparator module 424 may be moved to the DFE module 496. Although as shown the even error comparator module 420 and the even data comparator module 424 still include DFE modules 500, the DFE modules 500 may be eliminated if all of the associated DACs are moved to the shared DFE module 496. The sampler 488 is clocked with the odd data clock 468.

The digital adaptation module 452 provides additional feedback signals 504-1 and 504-2 (referred to collectively as the feedback signals 504) to the DFE modules 480 and 496, respectively. However, if the DFE modules 484 and 500 are eliminated as described above, the digital adaptation module 452 may only provide the feedback signals 504 and not the feedback signals 456. Further, the odd data clock 464 and the even data clock 468 may be provided from the same clock data recovery loop, or may be provided from independent or partially independent clock data recovery loops.

Figure 5:
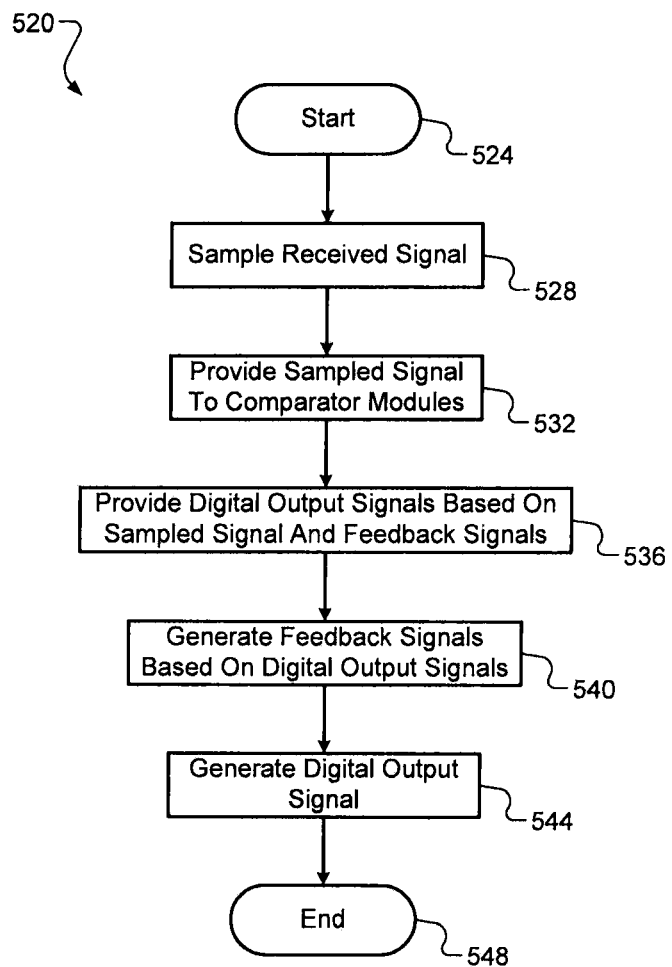
FIG. 5 illustrates a method of operating a receiver path.

Accordingly, because the odd error comparator module 412 and the odd data comparator module 416 share the sampler 472, the summer 476, and the DACs of the DFE module 480, mismatch errors between the odd error comparator module 412 and the odd data comparator module 416 are further reduced. Similarly, because the even error comparator module 420 and the even data comparator module 424 share the sampler 488, the summer 492, and the DACs of the DFE module 496, mismatch errors between the even error comparator module 420 and the even data comparator module 424 are further reduced. FIG. 5 shows a method 520 of operating a receiver path including both an odd error comparator module and an even error comparator module. The method 520 begins at 524. At 528, the method 520 samples a signal received via a communication channel. At 532, the sampled signal is provided to each of an odd error comparator module, an odd data comparator module, an even error comparator module, and an even data comparator module. At 536, the odd error comparator module, the odd data comparator module, the even error comparator module, and the even data comparator module provide respective digital output signals based on the sampled signal and respective feedback signals. At 540, the method 520 uses digital adaptation to generate and provide the respective feedback signals to the odd error comparator module, the odd data comparator module, the even error comparator module, and the even data comparator module. At 544, the method 520 provides a digital output signal. The method ends at 548.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory (such as flash memory), volatile memory (such as static random access memory and dynamic random access memory), magnetic storage (such as magnetic tape or hard disk drive), and optical storage.

The apparatuses and methods described in this application may be partially or fully implemented by one or more computer programs executed by one or more processors. The computer programs include processor-executable instructions that are stored on at least one non-transitory, tangible computer-readable medium. The computer programs may also include and/or rely on stored data.

What is claimed is:

1. A receiver path for processing a received signal including first data and second data, the receiver path comprising:
   a first comparator module configured to (i) receive only the first data in the received signal and (ii) generate, based on a first clock signal, a first digital output signal, wherein the first digital output signal is indicative of a sum of the first data in the received signal and a first error associated with the first comparator module, and wherein the first data and the first error correspond to odd data and an odd error, respectively;
   a second comparator module configured to (i) receive only the second data in the received signal and (ii) generate, based on a second clock signal, a second digital output signal, wherein the second digital output signal is indicative of a sum of the second data in the received signal and a second error associated with the second comparator module, and wherein the second data and the second error correspond to even data and an even error, respectively;
   a third comparator module configured to (i) receive only the first data in the received signal and (ii) generate, based on the first clock signal, a third digital output signal, wherein the third digital output signal is indicative of the first data in the received signal; and
   a fourth comparator module configured to (i) receive only the second data in the received signal and (ii) generate, based on the second clock signal, a fourth digital output signal, wherein the fourth digital output signal is indicative of the second data in the received signal.

2. The receiver path of claim 1, wherein i) the first comparator module and the third comparator module receive the first clock signal, and ii) the second comparator module and the fourth comparator module receive the second clock signal.

3. The receiver path of claim 2, wherein i) the first clock signal is an odd clock signal, and ii) the second clock signal is an even clock signal.

4. The receiver path of claim 2, wherein the first clock signal and the second clock signal have a phase difference of approximately 180 degrees.

5. The receiver path of claim 2, further comprising:
   a first sampler configured to provide first samples of the received signal to the first comparator module and the third comparator module, wherein the first samples correspond to the first data in the received signal; and
   a second sampler configured to provide second samples of the received signal to the second comparator module and the fourth comparator module, wherein the second samples correspond to the second data in the received signal.

6. The receiver path of claim 5, wherein i) the first sampler receives the first clock signal, and ii) the second sampler receives the second clock signal.

7. The receiver path of claim 5, further comprising:
   a first decision feedback estimation module configured to i) modify the first samples, and ii) provide the modified first samples to the first comparator module and the third comparator module; and
   a second decision feedback estimation module configured to i) modify the second samples, and ii) provide the modified second samples to the second comparator module and the fourth comparator module.

8. The receiver path of claim 7, wherein i) the first decision feedback estimation module is configured to modify the first samples based on a first feedback signal, and ii) the second decision feedback estimation module is configured to modify the second samples based on a second feedback signal.

9. The receiver path of claim 8, further comprising a digital adaptation module configured to:
based on the first digital output signal and the third digital output signal, generate the first feedback signal; and
based on the second digital output signal and the third digital output signal, generate the second feedback signal.

10. A method for operating a receiver path to process a received signal including first data and second data, the method comprising:
using a first comparator module,
receiving only the first data in the received signal, and
generating, based on a first clock signal, a first digital output signal, wherein the first digital output signal is indicative of a sum of the first data in the received signal and a first error associated with the first digital output signal, and wherein the first data and the first error correspond to odd data and an odd error, respectively;
using a second comparator module,
receiving only the second data in the received signal, and
generating, based on a second clock signal, a second digital output signal, wherein the second digital output signal is indicative of a sum of the second data in the received signal and a second error associated with the digital output signal, and wherein the second data and the second error correspond to even data and an even error, respectively;
using a third comparator module,
receiving only the first data in the received signal, and
generating, based on the first clock signal, a third digital output signal, wherein the third digital output signal is indicative of the first data in the received signal; and
using a fourth comparator module,
receiving only the second data in the received signal, and
generating, based on the second clock signal, a fourth digital output signal, wherein the fourth digital output signal is indicative of the second data in the received signal.

11. The method of claim 10, wherein generating the first digital output signal and generating the third digital output signal include receiving the first clock signal, and wherein generating the second digital output signal and generating the fourth digital output signal include receiving the second clock signal.

12. The method of claim 11, wherein i) the first clock signal is an odd clock signal, and ii) the second clock signal is an even clock signal.

13. The method of claim 11, wherein the first clock signal and the second clock signal have a phase difference of approximately 180 degrees.

14. The method of claim 11, wherein:
generating the first digital output signal and generating the third digital output include generating first samples of the received signal, wherein the first samples correspond to the first data in the received signal; and
generating the second digital output signal and generating the fourth digital output signal include generating second samples of the received signal, wherein the second samples correspond to the second data in the received signal.

15. The method of claim 14, wherein i) generating the first samples includes receiving the first clock signal, and ii) generating the second samples includes receiving the second clock signal.

16. The method of claim 14, further comprising:
modifying the first samples; and
modifying the second samples.

17. The method of claim 16, wherein modifying the first samples includes modifying the first samples based on a first feedback signal, and wherein modifying the second samples includes modifying the second samples based on a second feedback signal.

18. The method of claim 17, further comprising:
based on the first digital output signal and the third digital output signal, generating the first feedback signal; and
based on the second digital output signal and the third digital output signal, generating the second feedback signal.

* * * * *